United States Patent [15] 3,705,259
[45] Dec. 5, 1972

[54] NETWORKS FOR SETTING UP AND ADJUSTING THE COLOR TEMPERATURE OF THE PICTURE REPRODUCED BY THE PICTURE TUBE OF A COLOR TELEVISION RECEIVER

[73] Assignees: John D. Lovely, Waterloo, Ontario, Canada; Electrohome Limited, Kitchener, Ontario, Canada

[22] Filed: Sept. 2, 1971

[21] Appl. No.: 177,412

Related U.S. Application Data

[63] Continuation-in-part of Ser. No. 43,471, June 4, 1970, abandoned.

[52] U.S. Cl. ....................178/5.4 R
[51] Int. Cl. ....................H04n 9/16
[58] Field of Search.178/5.4, 5.4 HE, 5.4 M, 5.4 MC

[56] References Cited

UNITED STATES PATENTS 3,457,362 7/1969 Mackey et al. ....................178/5.4 R
3,470,311 9/1969 Fyler....................178/5.4 R

*Primary Examiner*—Richard Murray
*Attorney*—Sim & McBurney

[57] ABSTRACT

A simple network for setting up and adjusting the color temperature of the picture reproduced by the picture tube of a color television receiver and which requires that only one control be brought out to a location where it is accessible to a customer or serviceman includes a variable resistor directly connected in circuit with one of the "red" and "green" electron guns of the picture tube for varying the strength of the signal translated by the luminance signal channel of the receiver and applied to the gun without varying any D.C. potential of the gun. Another variable resistor is directly connected in circuit with the other two guns of the picture tube and varies simultaneously but in opposite directions the strength of the signal translated by the luminance signal channel and applied to the two guns without varying any D.C. potential thereof.

13 Claims, 3 Drawing Figures

INVENTOR.
JOHN D. LOVELY
BY [signature]

INVENTOR.
JOHN D. LOVELY
BY

NETWORKS FOR SETTING UP AND ADJUSTING THE COLOR TEMPERATURE OF THE PICTURE REPRODUCED BY THE PICTURE TUBE OF A COLOR TELEVISION RECEIVER

This is a continuation-in-part of copending patent application Ser. No. 43,471, filed June 4, 1970 now abandoned.

This invention relates to compatible color television receivers. More particularly this invention relates to networks for setting up and adjusting the color temperature of the picture reproduced by the picture tube of a color television receiver.

It is common practice to set up the color temperature of the picture reproduced by the picture tube of a color television receiver in the manner shown in U.S. Pat. No. 3,114,796, issued Dec. 17, 1963 to J. Stark, Jr. et al for example, wherein a fixed resistor is connected to the cathode electrode of the "red" electron gun, while potentiometers or variable resistors are connected to the cathodes of the "blue" and "green" electron guns of the picture tube, the luminance signal being supplied to the cathodes of the electron guns via the fixed resistor and two potentiometers. Color temperature is adjusted in such a system by varying the positions of the sliders of the two potentiometers. One problem with such an arrangement is that two controls must be brought out in a position where they are accessible to the customer or serviceman. In addition, it is well known that it is difficult for most customers to properly adjust the settings of both potentiometers, as usually must be done in order to adjust color temperature properly, and even for a serviceman this can be a time-consuming job.

In accordance with this invention there is provided a network for setting up and adjusting color temperature which requires that only one control be brought out to a location where it is accessible to the customer or serviceman and wherein, after initial set-up of color temperature, normally variation of only one control is required to properly adjust color temperature.

This invention will become more apparent from the following detailed description, taken in conjunction with the appended drawings, in which.

Figure 1:
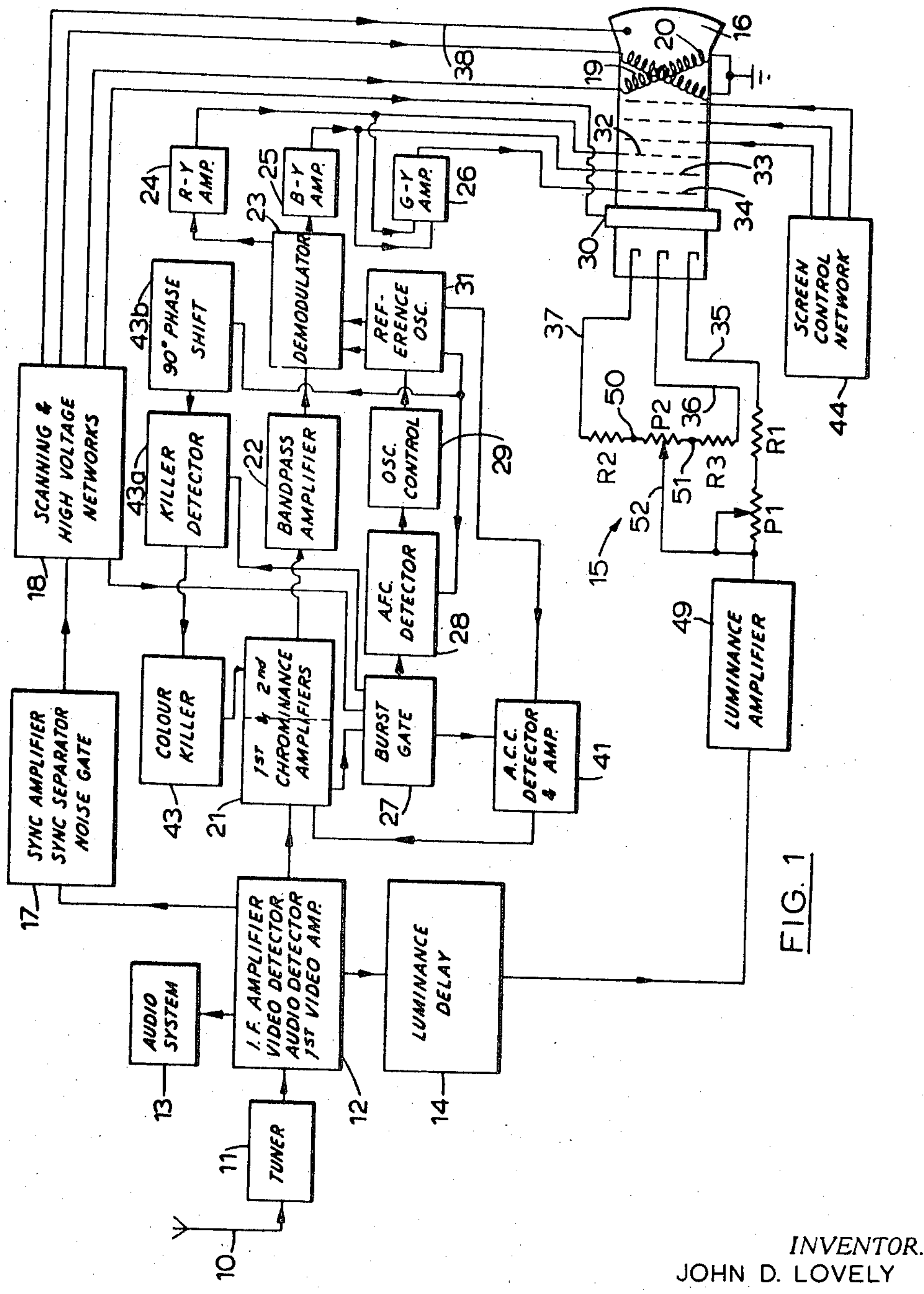
FIG. 1 is a diagram partly in block form of a color television receiver embodying this invention.

Those skilled in the art will appreciate that the color television receiver shown in FIG. 1 employs conventional components for the most part, so that only a brief description will be given herein of the conventional components of the receiver of FIG. 1 and their mode of operation. With reference to FIG. 1, an antenna 10 is connected to the input circuit of a tuner 11 that comprises one or more radio frequency (R.F.) amplification stages and a first detector. The signal to which the tuner is tuned is amplified by the R.F. amplifier or amplifiers and detected, the detected signal then being applied to a block designated 12 containing one or more intermediate frequency (I.F.) amplifiers, a video detector, an audio detector and a first video amplifier. The detected signal from tuner 11 is amplified by the one or more I.F. amplifiers, the audio and video components of the signal detected and the video signal amplified by the first video amplifier.

The luminance component (Y) of the video signal is applied to the luminance channel. It is delayed by delay network 14 and then applied to the luminance amplifier 49 and drive or color temperature control network 15 for the conventional three gun picture tube 16 of the receiver. As shown, the drive control network of this invention has three output lines 35, 36 and 37 connected to the cathodes of the "red", "green" and "-blue" electron guns respectively of picture tube 16.

The detected audio signal is supplied to a block 13 designated audio system and comprising a limiter, a discriminator, an audio frequency (A.R.) amplifier of one or more stages and a loudspeaker, the audio signal thereby being reproduced in a well known manner.

Synchronizing (sync) information is derived by one of the detectors in block 12 and applied to a block 17 consisting of a sync amplifier, sync separator and noise gate. The sync signal output from block 17 is applied to a block 18 containing the scanning and high voltage networks of the receiver. More specifically, block 18 comprises a horizontal scanning signal generator consisting of a line frequency oscillator, a phase detector and a frequency control stage for providing automatic control of the oscillator frequency; a vertical scanning signal generator; a horizontal convergence network; and a vertical convergence network. A horizontal scanning signal is developed and applied to the primary winding of an output transformer (not shown) having its secondary winding connected to the horizontal scanning coil 20 of the deflection yoke (not shown) of the receiver. A vertical scanning signal is developed and is coupled to the vertical scanning coil 19 of the deflection yoke of the receiver. Vertical and horizontal convergence signals also are developed and applied to a deflection yoke assembly shown schematically at 30. One high D.C. voltage output line 38 of the high voltage network of block 18 also is connected to picture tube 16.

An automatic gain control system may be included within block 17 to develop an A.G.C. potential for application to tuner 11 and one of the I.F. amplification stages in block 12, as is well known.

The chrominance component of the video signal is applied to the chrominance channel where it is amplified by first and second chrominance amplifiers 21, and a part of the signal then is applied to a bandpass amplifier 22, another part of the signal being applied to a color burst amplifier or gate 27. Keying pulses from block 18 are applied to color burst amplifier 27, and it applies its output to an automatic frequency control (A.F.C.) detector 28, an automatic chroma control (A.C.C.) detector and amplifier network 41 and a killer detector **43*a*. A.F.C. detector 28 provides a control signal that is applied to an oscillator control device 29 that controls the frequency of a color or reference oscillator 31. The output signal of oscillator 31 is applied to A.C.C. detector 41, A.F.C. detector 28, a color demodulator 23 and also to killer detector 43*a* via a 90° phase shift network 43*b*. The output signal of bandpass amplifier 22 also applied to demodulator 23, which may comprise a pair of synchronous demodulators for developing a red color difference signal (R-Y) and a blue color difference signal (B-Y). A green color difference signal (G-Y) is obtained by matrixing the red and blue color difference signals; and these three signals are amplified by color difference amplifiers 24**, 25 and 26 respectively and applied directly or via keyed clamps (not shown) to the control grids 32, 33 and 34 respectively of the three electron guns of picture tube 16.

The operating frequency and phase of oscillator 31 corresponds to that of the color burst signal (3.58 MHz), and the oscillator output signal and the signal burst amplifier or gate 27 are compared in A.C.C. detector 41. A.C.C. detector 41 produces a signal indicative of reception of a color signal and that varies in magnitude with the level of the received signal. This signal is supplied to the first chrominance amplifier in block 21 to vary the gain of this amplifier to compensate for variations in the level of the received signal. The output of a color killer 43 is applied to the second chrominance amplifier in block 21 and determines whether this amplifier is biased on or off, color killer 43 being connected to killer detector 43*a*. In the absence of a color burst signal, killer 43 biases the second chrominance amplifier off.

The block 44 designates a conventional screen control network connected to the three screen electrodes of the three guns of color picture tube 16.

Color temperature control network 15 embodying this invention includes a variable resistor or potentiometer P1 connected between the luminance amplifier 49 and the cathode of the "red" gun, this connection being accomplished via a current limiting resistor R1. Also included in the network is potentiometer P2 having fixed terminals 50 and 51 and 51 and a movable terminal or slider 52 located intermediate terminals 50 and 51. Terminal 50 is connected to the cathode electrode of the "blue" electron gun via a current limiting resistor R2, while terminal 51 is connected to the cathode electrode of the "green" electron gun by a current limiting resistor R3. The slider 52 of potentiometer P2, like the slider of potentiometer P1, is connected to the output terminal of luminance amplifier 49.

Figure 2:
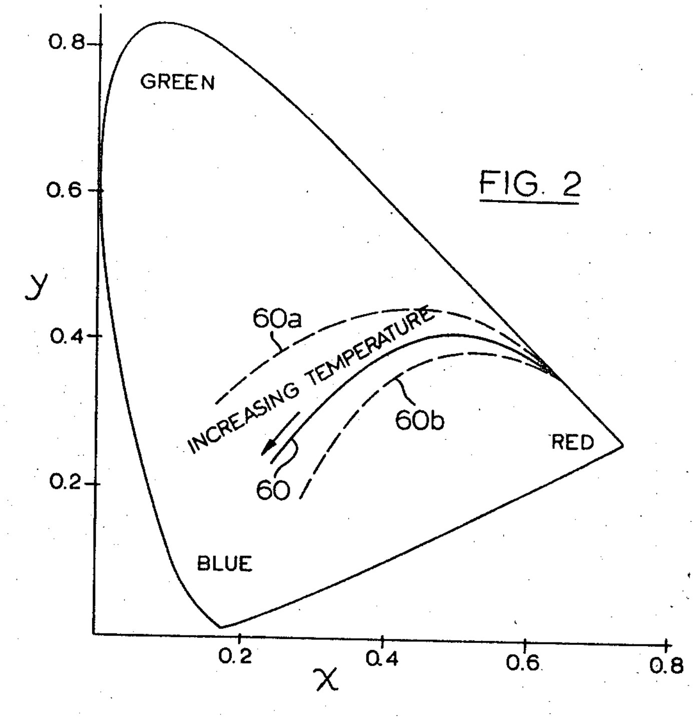
FIG. 2 is a conventional chromaticity diagram.

The operation of network 15 may best be understood by reference to FIG. 2. The effect of varying the position of slider 52 is to move the curve designated 60 between its upper position 60*a* and its lower position 60*b*. As may be seen from FIG. 2, movement of slider 52 varies the strengths of the signal applied to the "-blue" and "green" guns in opposite directions. It will be assumed for the purpose of discussion that with slider 52 in the position shown in FIG. 1, curve 60 will be in its solid line position as shown in FIG. 2. The effect of varying potentiometer P1 then is to move to the right or left in FIG. 2 along curve 60, whereby color temperature is varied, color temperature increasing from right to left along the curve.

The position of slider 52 is set at the factory and, once adjusted, need not be varied by the customer. Consequently, only the slider for potentiometer P1 need be brought to a location where it is accessible to the customer or serviceman, and, once potentiometer P2 has been properly set, a satisfactory degree of color temperature control normally can be effected by varying the setting of the slider of potentiometer P1.

Figure 3:
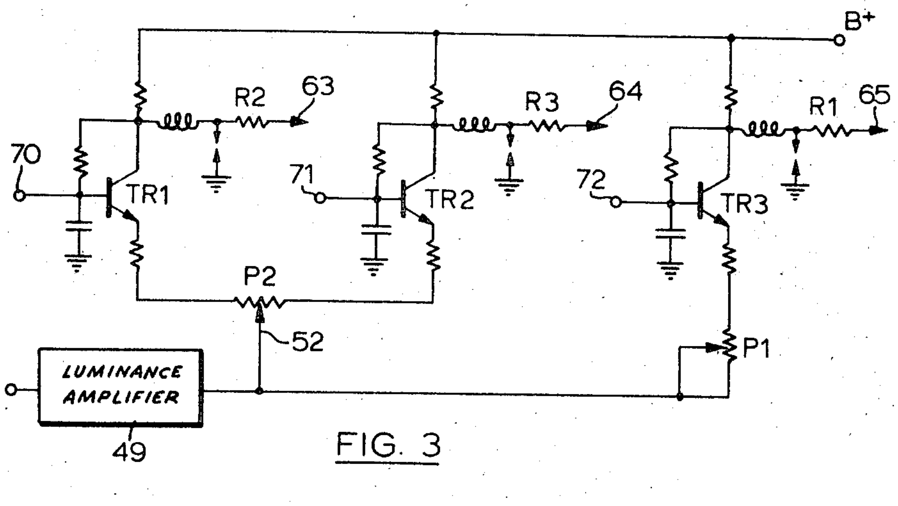
FIG. 3 is a circuit diagram of another network embodying this invention.

In the embodiment of the invention shown in FIG. 3, transistors TR1, TR2 and TR3 and their associated components are "blue", "green" and "red" color signal amplifiers, color difference signals being applied to their base electrodes via input terminals 70, 71 and 72. The collector electrodes of the three transistors are connected to output terminals 63, 64 and 65 via resistors R2 R3 and R1 respectively, and the output terminals in turn are connected to the cathodes of the "-blue", "green" and "red" guns respectively of a color picture tube 16.

Potentiometer P2 is connected as shown in FIG. 3 and in the same manner as in FIG. 1, the slider 52 of potentiometer P2 being connected to the output terminal of luminance amplifier 49 and the fixed terminals of the potentiometer being connected to the emitter electrodes of transistors TR1 and TR2. The luminance amplifier similarly is connected via potentiometer P1 to the emitter electrode of transistor TR3. In this embodiment of the invention the color difference signals are matrixed with the luminance signal before being applied to the electron guns of the picture tube, so that R, G and B color hue signals rather than hue signals of the color difference type are employed, and these are supplied to the cathodes of the "red", "green" and "blue" guns, while suitable potentials are applied to the grid electrodes of these guns.

As in the embodiment of FIG. 1, color temperature is initially set up by adjusting the settings of potentiometers P2 and P1, and color temperature subsequently may be adjusted simply by adjusting the setting of potentiometer P1. In this respect, movement of slider 52 to decrease the resistance in the emitter circuit of transistor TR1 and increase the resistance in the emitter circuit of transistor TR2 moves curve 60 downwardly in FIG. 2 to make the picture more blue, while movement of slider 52 in the opposite direction makes the picture more green. Movement of the slider of potentiometer P1 to decrease the resistance in the emitter circuit of transistor TR3 has the effect of movement to the right on curve 60 and hence a decrease in color temperature, and vice versa.

It will be noted from FIGS. 1 and 3 that potentiometers P1 and P2 are directly connected in circuit with their respective electron guns, as opposed to the arrangement shown in U.S. Pat. No. 3,457,362, D. G. Mackey et al, issued July 22, 1969 where there are four potentiometers and one of the three terminals of each is ground. This is of importance, since direct connection results in their being no change in the D.C. potentials of the electron guns as the sliders of potentiometers P1 and P2 are moved, and hence no change in black level.

This invention also may be practiced by presetting the "green" drive control and placing the differential control between the "blue" and "red" electron guns. Thus, referring to FIG. 1, another embodiment of this invention exists when 35 is the cathode of the "green" electron gun 36 and 37 are the cathodes of the "red" and "blue" electron guns. Similarly, referring to FIG. 3, transistors, TR1, TR2 and TR3 may be the "blue", "red" and "green" color signal amplifiers respectively, their output terminals being connected to the cathodes of the "blue", "red" and "green" guns respectively of cathode of ray tube 16. In both of these embodiments only slider 52 need be brought to a location where it is accessible to the customer or service man. Once potentiometer P1 has been properly set, a satisfactory degree of color temperature control normally can be effected by varying the position of slider 52.

What I claim as may invention is:

1. In a receiver for producing monochrome and color images of televised scenes of a type having a chrominance signal channel, a luminance signal channel, a cathode ray tube having "red", "green" and "-blue" electron guns for translating red, green and blue hue signals respectively, each of said electron guns including a cathode and a grid electrode, and means connecting said channels to said electron guns to supply signals translated by said channels to said electron guns, the improvement wherein said luminance signal channel includes first variable resistance means directly connected in circuit with one of said "red" and "green" guns for varying the strength of the signal translated by said luminance signal channel and applied to said one gun without varying any D.C. potential of said one gun and second variable resistance means directly connected in circuit with the other two of said guns and arranged to vary simultaneously but in opposite directions the strength of the signal translated by said luminance signal channel and applied to said other two guns without varying any D.C. potential of said other two guns.

2. The invention according to claim 1 wherein said one gun is said "red" gun and said other two guns are said "blue" and "green" guns.

3. The invention according to claim 2 wherein said second variable resistance means is a potentiometer having first and second terminals and a movable terminal intermediate said first and second terminals, said first and second terminals being connected in circuit with said "blue" and "green" guns respectively, and the signal translated by said luminance signal channel being supplied to said "blue" and "green" guns via said movable terminal and then via said first and second terminals respectively, whereby movement of said movable terminal varies the strength of the signal translated by said luminance signal channel and applied to said "-blue" and "green" guns simultaneously and in opposite directions.

4. The invention according to claim 4 wherein said first variable resistance means and said first and second terminals are connected to said cathode electrodes of said "red", "blue" and "green" guns respectively.

5. The invention according to claim 3 wherein said receiver includes "red", "green" and "blue" color signal amplifiers and networks for matrixing the signal translated by said luminance signal channel and "red", "green" and "blue" color difference signals translated by said chrominance signal channel, and means including said first and second variable resistance means for supplying the signal translated by said luminance signal channel to said "red" and to said "green" and "blue" color signal amplifiers and networks respectively.

6. The invention according to claim 3 wherein said first and second variable resistance means are the sole means in said luminance signal channel for varying the color temperature of the picture reproduced by said cathode ray tube.

7. The invention according to claim 6 wherein said first variable resistance means and said first and second terminals are connected to said cathode electrodes of said "red", "blue" and "green" guns respectively.

8. The invention according to claim 6 wherein said receiver includes "red", "green" and "blue" color signal amplifiers and networks for matrixing the signal translated by said luminance signal channel and "red", "green" and "blue" color difference signals translated by said chrominance signal channel, and means including said first and second variable resistance means for supplying the signal translated by said luminance signal channel to said "red" and to said "green" and "blue" color signal amplifiers and networks respectively.

9. The invention according to claim 1 wherein said one gun is said "green" gun and said other two guns are said "blue" and "red" guns.

10. The invention according to claim 9 wherein said second variable resistance means is a potentiometer having first and second terminals and a movable terminal intermediate said first and second terminals, said first and second terminals being connected in circuit with said "blue" and "red" guns respectively, and the signal translated by said luminance signal channel being supplied to said "blue" and "red" guns via said movable terminal and then via said first and second terminals respectively, whereby movement of said movable terminal varies the strength of the signal translated by said luminance signal channel and applied to said "-blue" and "red" guns simultaneously and in opposite directions.

11. The invention according to claim 10 wherein said first variable resistance means and said first and second terminals are connected to said cathode electrodes of said "green", "blue" and "red" guns respectively.

12. The invention according to claim 10 wherein said receiver includes "red", "green" and "blue" color signal amplifiers and networks for matrixing the signal translated by said luminance signal channel and "red", "green" and "blue" color difference signals translated by said chrominance signal channel, and means including said first and second variable resistance means for supplying the signal translated by said luminance signal channel to said "green" and to said "blue" and "red" color signal amplifiers respectively.

13. The invention according to claim 10 wherein said first and second variable resistance means are the sole means in said luminance signal channel for varying the color temperature of the picture reproduced by said cathode ray tube.

* * * * *